United States Patent
Schroeder et al.

(10) Patent No.: US 11,325,446 B2
(45) Date of Patent: May 10, 2022

(54) METHOD FOR OPERATING A REFRIGERATION SYSTEM FOR A VEHICLE AND A CORRESPONDING REFRIGERATION SYSTEM

(71) Applicant: AUDI AG, Ingolstadt (DE)

(72) Inventors: Dirk Schroeder, Manching (DE); Helmut Rottenkolber, Mindelstetten (DE)

(73) Assignee: AUDI AG, Ingolstadt (DE)

( * ) Notice: Subject to any disclaimer, the term of this patent is extended or adjusted under 35 U.S.C. 154(b) by 107 days.

(21) Appl. No.: 16/560,098

(22) Filed: Sep. 4, 2019

(65) Prior Publication Data

US 2020/0070629 A1 Mar. 5, 2020

(30) Foreign Application Priority Data

Sep. 4, 2018 (DE) .................. 10 2018 215 024.9

(51) Int. Cl.
*B60H 1/32* (2006.01)
*B60H 1/26* (2006.01)
*B60H 1/00* (2006.01)

(52) U.S. Cl.
CPC ....... *B60H 1/3207* (2013.01); *B60H 1/00321* (2013.01); *B60H 1/00328* (2013.01); *B60H 1/26* (2013.01); *B60H 1/3211* (2013.01); *B60H 1/3227* (2013.01); *B60H 2001/0015* (2013.01); *B60H 2001/3251* (2013.01); *B60H 2001/3252* (2013.01); *B60H 2001/3277* (2013.01); *B60H 2001/3282* (2013.01)

(58) Field of Classification Search
CPC ............. B60H 1/3207; B60H 1/00321; B60H 1/00328; B60H 1/26; B60H 1/3211; B60H 1/3227; B60H 2001/0015; B60H 2001/3251; B60H 2001/3252; B60H 2001/3277; B60H 2001/3282
See application file for complete search history.

(56) References Cited

U.S. PATENT DOCUMENTS 5,205,484 A * 4/1993 Susa .................. B60K 11/085
  236/35.3
5,253,483 A * 10/1993 Powell ................ B60H 1/3211
  62/181

(Continued)

FOREIGN PATENT DOCUMENTS

CN 202928182 U 5/2013
CN 104964423 A 10/2015

(Continued)

OTHER PUBLICATIONS

Chinese Office Action dated Feb. 20, 2021, in connection with corresponding CN Application No. 201910827570.0 (18 pp., including machine-generated English translation).

(Continued)

*Primary Examiner* — Ljiljana V. Ciric
(74) *Attorney, Agent, or Firm* — Maier & Maier, PLLC

(57) ABSTRACT

A method for operating a refrigeration system for a vehicle with a refrigerant circuit including a heat exchanger. A controllable environmental air flow (L) is flowed through the heat exchanger and the heat exchanger can be operated as a refrigerant condenser or a gas cooler for a refrigeration system operation.

10 Claims, 2 Drawing Sheets

(56) References Cited

U.S. PATENT DOCUMENTS

Figure 1:
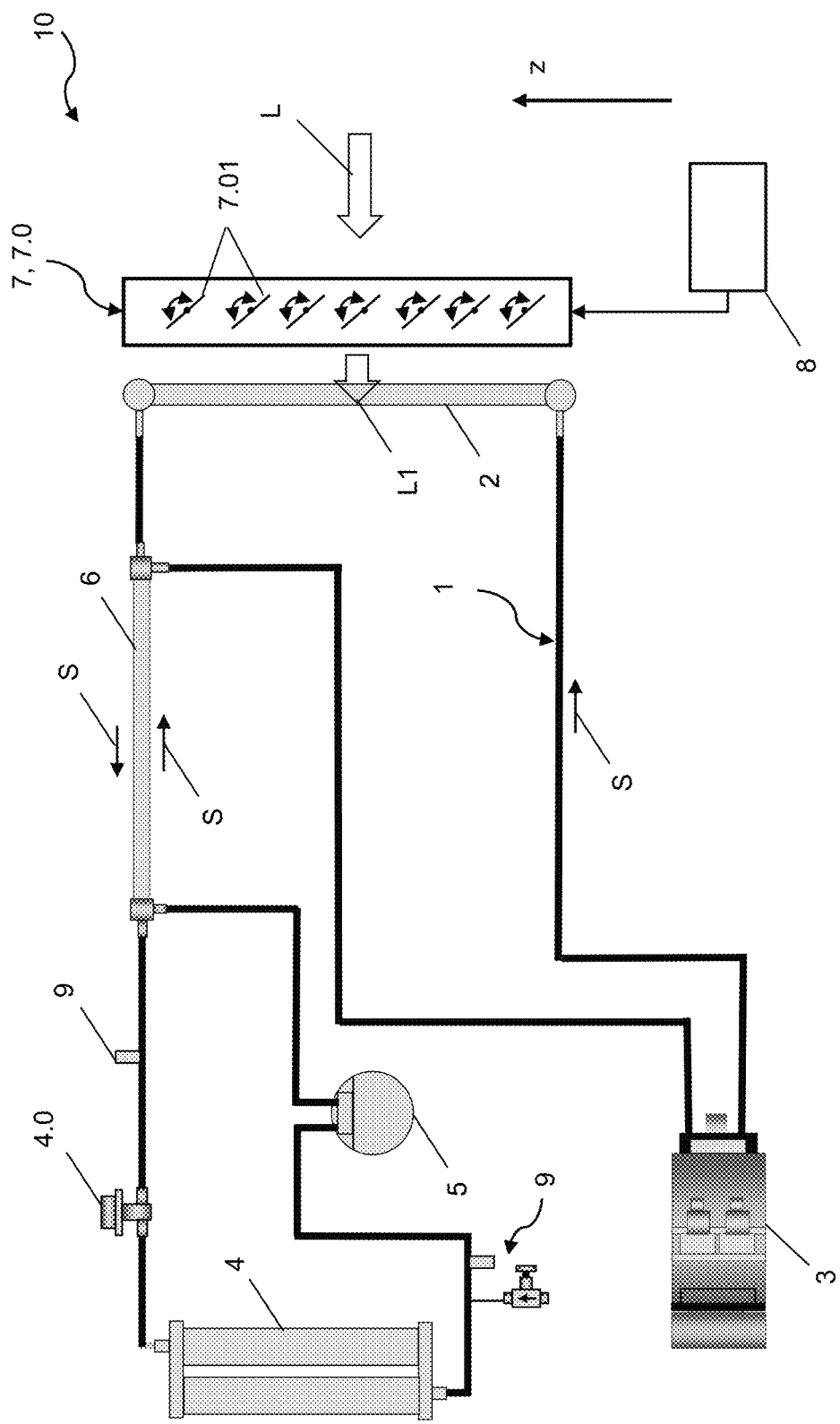

| | | | | |
|---|---|---|---|---|
| 5,257,508 | A * | 11/1993 | Powell | B60H 1/3205 62/180 |
| 5,624,310 | A * | 4/1997 | Fredriksson | B60H 1/3207 454/121 |
| 8,662,569 | B2 * | 3/2014 | Klop | B60K 11/085 296/193.1 |
| 8,825,308 | B2 * | 9/2014 | Nishimura | B60H 1/3208 701/49 |
| 8,903,599 | B2 * | 12/2014 | Sato | B60H 1/00978 701/34.4 |
| 9,134,080 | B2 | 9/2015 | Leonard | |
| 9,163,603 | B2 * | 10/2015 | Wakou | F02N 11/084 |
| 9,476,345 | B2 * | 10/2016 | Styles | F02B 29/0431 |
| 9,650,942 | B2 * | 5/2017 | Surnilla | F02B 29/04 |
| 9,938,914 | B2 * | 4/2018 | Brinkmann | B60H 1/3207 |
| 10,471,966 | B2 * | 11/2019 | Dudar | B60K 11/085 |
| 10,647,194 | B1 * | 5/2020 | Burtch | B60K 11/085 |
| 10,718,282 | B2 * | 7/2020 | Dudar | G07C 5/0808 |
| 10,913,332 | B2 * | 2/2021 | Sato | B60H 1/32 |
| 2006/0102399 | A1 * | 5/2006 | Guilfoyle | B60K 11/085 180/68.1 |
| 2016/0368366 | A1 * | 12/2016 | Miller | F01P 7/12 |
| 2017/0009677 | A1 * | 1/2017 | Brinkmann | F02M 35/10157 |
| 2017/0082045 | A1 * | 3/2017 | Makled | F02D 41/0077 |
| 2017/0120743 | A1 * | 5/2017 | Dudar | B60K 11/085 |
| 2019/0366803 | A1 * | 12/2019 | Harris | B60H 1/3222 |

FOREIGN PATENT DOCUMENTS

| | | |
|---|---|---|
| CN | 206589833 U | 10/2017 |
| DE | 199 18 617 A1 | 11/2000 |
| DE | 10 2004 046 459 B3 | 10/2005 |
| DE | 10 2016 109 590 A1 | 12/2016 |
| EP | 189 255 A1 | 7/1986 |
| EP | 2 360 440 A1 | 8/2011 |
| EP | 2 072 296 B1 | 8/2014 |

OTHER PUBLICATIONS

Examination Report dated May 8, 2019 in corresponding German application No. 10 2018 215 024.9; 12 pages.

* cited by examiner

METHOD FOR OPERATING A REFRIGERATION SYSTEM FOR A VEHICLE AND A CORRESPONDING REFRIGERATION SYSTEM

FIELD

The disclosure relates to a method for operating a refrigeration system for a vehicle with a refrigerant circuit including a heat exchanger.

BACKGROUND

A method according to the preamble for operating a refrigeration system for a vehicle with a heat exchanger is known from EP 2 072 296 B1, in which, for cooling an electrical energy storage of a vehicle, an outer condenser, as an air-refrigerant heat exchanger of a refrigerant circuit, which is in thermal contact with this energy storage, is flowed through by an airflow. The exposure of the condenser to air is selectively set by a butterfly valve. During operation at low outside temperatures, the flow of cold outside air through the condenser can thus be reduced, whereby the temperature level of the refrigerant in the condenser increases. The butterfly valve can be designed in such a manner that it at least partially covers a surface of the condenser which can be exposed to air. By opening or closing the surface, the amount of air flowing through the condenser can be selectably varied, resulting in an increase of the temperature level. The butterfly valve can be designed in the manner of a selectably adjustable louver by means of which at least a portion of the surface of the condenser can be closed to air throughflow.

It is known to provide motor vehicles with an adjustable air flap arrangement in the form of a radiator grille on the front side, by means of which the flow of cooling air through a cooler pack can be controlled as a function of the position of the air flaps. In addition to an air-refrigerant heat exchanger of a refrigerant circuit of a refrigeration system, such a cooler pack comprises additional heat exchangers such as, for example, a low temperature cooler, an intercooler, and optionally a cooler in a vehicle with a combustion engine.

Such air flap arrangements in general have multiple air flaps which can be opened or closed as needed.

Known from EP 2 360 440 A1 is a refrigerant circuit with a main circuit consisting of a refrigerant compressor, a condenser and an evaporator with associated expansion valve, and with a secondary circuit with a refrigerant compressor and at least one heat exchanger. A heat exchanger unit of the main circuit comprises the evaporator and a supercooling heat exchanger as well as an air flow control with an impingement plate or with a louver, by means of which an air flow is made to flow as uniformly as possible through the heat exchanger. For thawing a lower evaporator half, the air flow is led only through the upper evaporator half, while for thawing the upper evaporator half, the air flow is led through the lower evaporator half.

During a purely refrigeration system operation (also referred to as AC operation), in particular at low environmental temperatures of the vehicle, the problem can arise that the refrigeration system does not start up, i.e., the resting pressure level of the system already reaches the low pressure level that is expedient for the system operation, or that no stable continuous operation is reached, i.e., due to the low environmental temperature, the high pressure in the system is lowered to the extent that the compressor is unable to ensure a lasting stable difference pressure between the low pressure side and the high pressure side, in that the high pressure comes very close to the low pressure. This means that the resulting high pressure level is sufficiently low so that no pronounced pressure ratio between the low pressure side and the high pressure side is reached, i.e., the high pressure almost reaches the value of the low pressure, which in turn is equivalent to a pressure ratio of slightly more than 1. The reason for this is that the cooling effect which is achieved via the environmental heat exchanger (condenser or gas cooler of the refrigerant circuit of refrigeration system) is excessively dominant, resulting in a strong cooling of the refrigerant and, in the end, a low condensation pressure level.

In DE 10 2004 046 459 B3, this problem is solved with an air-conditioning system for a vehicle in that, as a function of the environmental air temperature, an actuator is actuated, by means of which a predetermined pressure ratio between the high pressure and the low pressure of the refrigerant circuit of the air-conditioning system is to be set or maintained. As actuator, a bypass valve arranged in a bypass line is provided, so that the refrigerant flows either through the heat exchanger or though the bypass line bypassing the heat exchanger. Such a bypass valve can also be implemented with a plurality of intermediate settings, whereby a subdivision of the refrigerant into a partial flow via the heat exchanger and a partial flow via the bypass line is enabled. Alternatively, instead of the bypass valve as actuator, a pressure buildup device, which is formed as an expansion device, for example, can also be used between a refrigerant compressor of the refrigerant circuit and the heat exchanger, by means of a which a sufficiently high pressure ratio between high pressure and low pressure of the refrigerant circuit can be set. Such an actuator is activated when the environmental temperature drops below a predetermined temperature limit value.

SUMMARY

The main purpose of the refrigeration system operation is to enable and maintain the dehumidification mode for the cabin air at low environmental load, in particular in order to circumvent the critical case of a tendency of the windshield to fog up.

Therefore, the aim of the invention is to indicate an improved method for operating a refrigeration system for a vehicle with a heat exchanger as a refrigerant condenser or gas cooler for a refrigeration system operation, with which, in particular at low environmental temperatures during the startup of the refrigeration system, an increasing high pressure level in the refrigerant circuit of the refrigeration system is generated, and a stable refrigeration system operation is ensured, in particular for conditioning a supply flow to be supplied to the vehicle interior of the vehicle. Another aim of the invention is to indicate a refrigeration system for carrying out the method.

In this method for operating a refrigeration system for a vehicle with a refrigerant circuit comprising a heat exchanger, in which the heat exchanger is flowed through by a controllable environmental air flow and can be operated as refrigerant condenser or gas cooler for a refrigeration system operation, it is provided, according to the second mentioned solution according to the invention, that, for setting a predetermined pressure ratio between the high pressure and the low pressure of the refrigerant circuit, the amount of air of the environmental air flow flowing through the heat exchanger is controlled by means of a device as a function of a temperature limit value of the environmental temperature of the vehicle, wherein, above the temperature limit value, the amount of air flowing through the heat exchanger is increased by means of the device, and, at an environmental temperature corresponding at most to the temperature limit value, the amount of air flowing through the heat exchanger is decreased by means of the device.

In this method according to the invention, a decrease of the high pressure in the refrigerant circuit, which is connected with a high condensation capacity or cooling capacity on the heat exchanger, is thereby prevented, or conversely an increase of the high pressure is achieved in that the amount of air of the environmental air flow cooling the heat exchanger is reduced by means of the device. Thus, instead of a complete air-side flow through the heat exchanger, accordingly, in the first type of refrigeration system operation, only a partial area of the heat exchanger is impinged on by or brought in contact with an environmental air flow. The control of the amount of air of the environmental air flow flowing through the heat exchanger occurs as a function of the environmental temperature, namely a temperature limit value which can be set, for example, at 6° C. for reducing the amount of air and at 8° C. for increasing the amount of air, since, in this temperature range, as a rule, only low capacities are implemented and thus only small amounts of heat have to be dissipated on the heat exchanger.

The second mentioned solution is characterized according to the invention in that the amount of air of the environmental air flow flowing through the heat exchanger is controlled by means of a device as a function of a pressure difference limit value of a pressure difference between the high pressure and the low pressure of the refrigerant circuit, wherein, at a pressure difference above the pressure difference limit value, the amount of air flowing through the heat exchanger is increased by means of the device, and, at a pressure difference less than or equal to the pressure difference limit value between the high pressure and the low pressure of the refrigerant circuit, the amount of air flowing through the heat exchanger is decreased by means of the device.

For the formation of the pressure difference between the high pressure and the low pressure of the refrigerant circuit, the value of the high pressure value detected via a pressure (temperature) sensor is used, and the difference compared to the value of the low pressure value is determined. If, in the case of chemical refrigerants, for example, a high pressure greater than 1 bar above the low pressure is set, then the amount of air flowing through the heat exchanger is increased, otherwise, that is say below this value, a reduction of the amount of air occurs. In the case of R744 as refrigerant, as a limit value for a pressure difference limit value, a value of 5 bar, for example, can be set.

The method according to the invention according to the first-mentioned and also according to the second-mentioned solution is preferably used for conditioning a supply flow to be supplied to the vehicle interior of the vehicle, i.e., for cooling and/or dehumidifying such a supply flow.

It is particularly advantageous if, in the method according to the invention, according to a development, the device is designed as a controllable air supply device.

For this purpose, according to a development, the air supply device is provided with a plurality of pivotable air flaps which can be pivoted individually, jointly or in groups between an open position or closed position. Such an air supply device can be implemented in the manner of a louver. Here, the air flaps can be pivoted by motor jointly between an open position and a closed position, and, by means of a control unit, they can be implemented or set as a function of the parameters, such as, for example, a resting pressure level or a difference value between a low pressure and a high pressure. As a function of the environmental temperature or as a function of the pressure difference value between the high pressure and the low pressure of the refrigerant circuit, the air flaps or lamellas are pivoted into an opening or a closing position, so that the amount of air is either increased or decreased.

The air flaps can also be combined in at least two groups, so the air flaps in each case are adjusted in groups jointly by motor and controlled by a control unit. Thus, the partial air flows of the environmental air flow generated by the respective groups can be controlled in terms of the amount of air thereof by a control unit.

The air flaps of such an air supply device can also be set individually by motor and adjusted as a function of a control unit. This offers the advantage that a nearly continuously adjustable setting of the supply amount to the heat exchanger can be achieved, and thus the high pressure value can be influenced in a manner comparable to a fine adjustment.

For the entire cooling surface of the heat exchanger to be usable, by means of the device, a cooling air flow from the environmental air flow is set with a cross section which corresponds to the maximum cooling surface of the heat exchanger.

Another advantageous design of the invention provides that the device is formed with at least two partial devices, wherein the partial devices correspond to disjoint cooling surfaces of the heat exchanger in such a manner that the partial cooling air flow generated by a partial device from the environmental air flow impinges on the cooling surface of the heat exchanger, which is associated with same. The partial devices are actuated in each case independently of one another by means of a control device, so that a partial cooling air flow is generated by these partial devices from the environmental air flow and amount of air thereof is controlled.

Such a refrigeration system for a vehicle with a refrigerant circuit comprising a heat exchanger is characterized according to the invention in that the heat exchanger can be operated as refrigerant condenser or gas cooler for a refrigeration system operation for carrying out the method according to the invention, the heat exchanger can be flowed through by a controllable environmental air flow, a device influencing the amount of air flowing through the heat exchanger is associated with the heat exchanger for generating the controllable environmental air flow, and, in addition to the heat exchanger, the refrigerant circuit comprises a refrigerant compressor, an evaporator with associated expansion valve, and a refrigerant compressor.

According to a development, the device is designed as a controllable air supply device, wherein this air supply device comprises a plurality of pivotable air flaps which can be pivoted individually, jointly or in groups between an open position or closed position as well as intermediate positions.

Preferably, the device is designed to set a cooling air flow from the environmental air flow with a cross section which corresponds to the maximum cooling surface of the heat exchanger. Thereby, the entire cooling surface of the heat exchanger can receive incident flow.

Finally, according to a last preferred embodiment of the invention, the device is formed with at least two partial devices in such a manner that the partial devices correspond to disjoint cooling surfaces of the heat exchanger, and the environmental air flow generated by a partial device impinges on the cooling surface of the heat exchanger, which is associated with same. The advantage of such a device consists in that individual flows of the heat exchanger are separated completely from the air flow, as needed, in particular in the case of condensers or gas coolers with flows impinged on selectively by refrigerant. The impinging of air on heat exchangers upstream and/or downstream of the heat exchanger functioning as a condenser or gas cooler represents an additional criterion. Said heat exchangers in this manner are not completely cut off from the air flow and, instead, are locally flowed through by a partial air flow in order to achieve a required cooling capacity in this manner.

Figure 2:
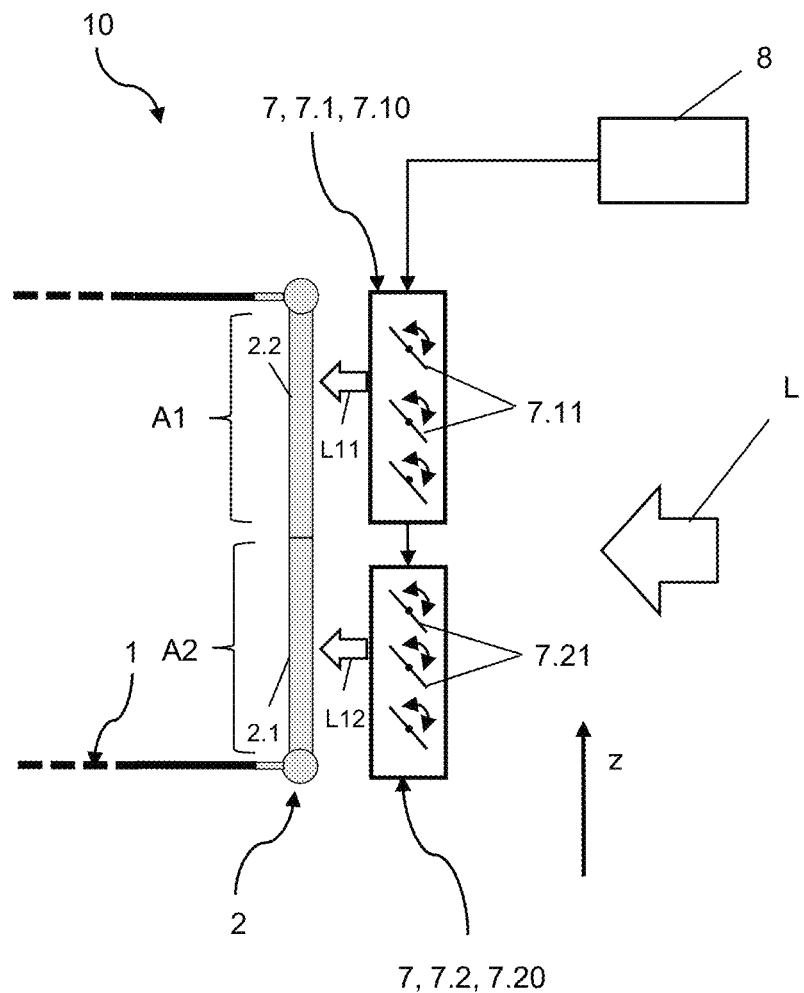

Additional advantages, features and details of the invention result from the following description of preferred embodiments and from the drawings. The figures show:

FIG. 1 a circuit diagram of an embodiment example of a refrigeration system according to the invention with a heat exchanger and a device for generating a cooling air flow flowing through the heat exchanger, and FIG. 2 a detailed representation of a heat exchanger with an alternative embodiment of the device for generating a cooling air flow flowing through the heat exchanger.

For explaining the method according to the invention, to begin with the refrigeration system 10 for a vehicle used therefor and represented in FIG. 1 is first explained.

The refrigeration system 10 represented in FIG. 1 consists of a refrigerant circuit 1 with carbon dioxide (R744) as refrigerant or with another suitable refrigerant. This refrigerant circuit 1 is operated in a refrigeration system operation, hereafter referred to as AC operation, wherein this refrigerant circuit 1 for a heat pump operation for conditioning a supply air flow to be supplied to the vehicle interior of the vehicle can be supplemented with the components known to a person skilled in the art.

The refrigerant circuit 1 according to FIG. 1 comprises a heat exchanger 2 which is operated as gas cooler or as condenser for the AC operation.

Furthermore, in addition to the heat exchanger 2, the refrigerant circuit 1 according to FIG. 1 comprises, a refrigerant compressor 3, an evaporator 4 which is preceded by an associated expansion device 4.0, a refrigerant collector 5, and an inner heat exchanger 6. These components are flowed through in a known manner in flow direction S by the refrigerant of the refrigerant circuit 1.

During the AC operation of the refrigerant circuit 1, the refrigerant compressed by means of the refrigerant compressor 3 flows in flow direction S into the heat exchanger 2, in which, as a function of the amount of air of an environmental air flow L1, the refrigerant is cooled, or cooled and condensed, and condensation heat is released to the vehicle environment.

After the refrigerant has left the heat exchanger 2, its pressure it is expanded via the high pressure section of the inner heat exchanger 6 by means of the expansion device 4.0 into the evaporator 4, in order to receive heat from the cabin supply flow. Subsequently, the refrigerant is returned via the refrigerant collector 5 and the low pressure section of the inner heat exchanger 6 to the refrigerant compressor 3.

The inclusion of the sensors (pressure, temperature, pressure temperature sensor) necessary for the proper operation of the system is dispensed with in the drawing since said sensors are known to the person skilled in the art.

A device 7 designed as an air supply device 7.0 is associated with the heat exchanger 2, by means of which an environmental air flow L is converted into a cooling air flow L1 and thus the heat exchanger 2 is impinged on for cooling the refrigerant in the area of same.

This air supply device 7.0 is implemented as a closable cooling air louver with pivotable air flaps 7.01 (also known as lamellas) which can be pivoted jointly between an open position, in which the entire cooling surface of the heat exchanger 2 is impinged on by the entire environmental air flow L as cooling air flow L1, and a closed position, in which the air flaps 7.01 are closed so that the cooling surface of the heat exchanger 2 is not impinged on by cooling air. Moreover, every intermediate position is possible, in which the amount of air of the supply flow L1 guided via the air flaps 7.01 is reduced to varying degrees in comparison to the amount of air of the entire environmental air flow L.

The cross section of the cooling air flow L1 generated by the air supply device 7.0 corresponds in the vehicle vertical direction (z direction) to at most the entire effective cooling surface of the heat exchanger 2, also in a vehicle vertical direction.

Due to the different design of the cooling air channels, but also due to the different positioning possibilities of the air supply device 7 in x direction, the exposed surface thereof can vary up to values which correspond to the entire effective cooling surface of the heat exchanger 2. The heat exchanger 2, as part of a unit cooler pack which can comprise additional components such as high and/or low temperature coolers, can itself also be oriented in different inclination positions.

The control of the air flaps 7.01 of the air supply device 7.0 occurs by means of a control unit 8 as a function of parameters such as, for example, the pressure levels, i.e., the pressure difference in the refrigerant circuit 1. The resting pressure level of the refrigerant circuit 1 is already reached at the low pressure level that is expedient for a system operation, so that a more stable continuous operation is not achieved, i.e., due to the low environmental temperature, the high pressure in the system is lowered to the extent that the refrigerant compressor 3 is not able to ensure a stable pressure difference between low pressure and high pressure side and, in the process, the high pressure comes very close to the low pressure. This means that the resulting high pressure level is sufficiently low so that no pronounced pressure ratio between the low pressure side and the high pressure side of the refrigeration system 10 is reached, i.e., the high pressure almost reaches the value of the low pressure, which in turn is equivalent to a pressure ratio of slightly more than 1. The reason for this is that the cooling effect achieved via the heat exchanger 2 is excessively dominant, whereby a strong cooling of the refrigerant results and, in the end, a low condensation pressure level is set.

During an AC operation, the air flaps 7.01, as a function of, for example, a detected environmental temperature or a determined pressure difference are steered into a predetermined pivoted position which corresponds to the open or closed position or to an intermediate position between the open and closed position.

For the AC operation, as a function of the environmental temperature of the vehicle, the air flaps 7.01, starting from a current position, are pivoted by means of the control unit 8 as a function of the environmental temperature of the vehicle. The environmental temperature is detected by means of a suitable temperature sensor and supplied to the control unit 8 for evaluation, wherein, in the control unit 8, for this purpose, a temperature limit value is stored.

If an environmental temperature which is higher than the temperature limit value is detected, the air supply device 7.0 is controlled by the control unit 8 in such a manner that the air flaps 7.01 are pivoted in the direction of their open position, whereby the amount of air of the cooling air flow L1 is increased by a predetermined amount. Thus, a maximum heat exchange occurs by means of the cooling air flow with the maximum amount of air supplied to the heat exchanger 2.

On the other hand, if the environmental temperature reaches the temperature limit value or if the environmental temperature drops below this temperature limit value, the air supply device 7.0 is controlled by the control unit 8 in such a manner that the air flaps 7.01 are pivoted in the direction of their closed position, so that the amount of air of the cooling air flow L1 is reduced by a predetermined amount.

Thus, for the heat exchange of the heat exchanger 2 with the environmental air of the vehicle, a smaller amount of air is available, whereby the condensation capacity in a heat exchanger 2 operated as refrigerant condenser or the cooling capacity in a heat exchanger 2 operated as gas cooler is also reduced in comparison to a flow through the heat exchanger 2 with the complete environmental air flow L. Thereby, during a startup of the refrigeration system 10 at low outside temperatures, an increase of the high pressure of the refrigerant circuit for achieving a sufficient pressure ratio between the low pressure and high pressure side of the refrigerant circuit 1 for ensuring a stable continuous operation is achieved, or it is achieved that during the operation of the refrigeration system a sufficient high pressure for ensuring a stable continuous operation is generated.

The temperature limit value can be set, for example, at 6° C. in order to reduce the amount of air of the cooling air flow L1 and at 8° C. in order to increase the amount of air of the cooling air flow L1, since, in this range, it can already be assumed that, on the system side, i.e., by the refrigerant circuit 1, only small capacities are implemented, and thus only smaller amounts of heat have to be dissipated on the heat exchanger 2.

Alternatively or additionally to the temperature limit value, in the control device 8, a pressure difference limit value can be stored. For this purpose, the value of the high pressure value detected by a pressure (temperature) sensor is used. If, in the case of a chemical refrigerant, for example, a high pressure of more than 1 bar relative to the low pressure is reached, then the amount of air of the cooling air flow L1 flowing through the heat exchanger 2 is increased, otherwise or below this value, a reduction of the amount of air of the cooling air flow L1 flowing through the heat exchanger 2 occurs. In the case of the refrigerant R744, for example, a value of 5 bar can be used as limit value for a pressure difference between the high pressure and the low pressure of the refrigerant circuit 1.

If a pressure difference which is greater than the pressure difference threshold value is detected, the air supply device 7.0 is controlled by the control unit 8 in such a manner that the air flaps 7.01 are pivoted in the direction of their open position, so that the amount of air of the cooling air flow L1 is increased by a predetermined amount. Thus, a maximum heat exchange occurs by means of the cooling air flow with a maximum amount of air supplied to the heat exchanger 2.

On the other hand, if the pressure difference reaches the pressure difference limit value or if the pressure difference falls below this pressure difference value, the air supply device 7.0 is controlled by the control unit 8 in such a manner that the air flaps 7.01 are pivoted in the direction of their closed position, so that the amount of air of the cooling air flow L1 is reduced by a predetermined amount.

Thus, for the heat exchange of the heat exchanger 2 with the environmental air of the vehicle, a smaller amount of air is available, whereby the condensation capacity in the case of a heat exchanger 2 operated as refrigerant condenser or the cooling capacity in the case of a heat exchanger 2 operated as gas cooler is also reduced in comparison to a throughflow with the complete environmental air flow L. Thereby, during a start up of the refrigeration system 10 at low outside temperatures, an increase of the high pressure of the refrigerant circuit is reached for achieving a sufficient pressure ratio between the low pressure and high pressure side of the refrigerant circuit 1 for ensuring a stable continuous operation, or it is achieved that during the operation of the refrigeration system a sufficient high pressure for ensuring a stable continuous operation is generated.

In contrast to the joint control of the air flaps 7.01, it is also possible, alternatively, to enable each individual air flap 7.01 to be actuated individually by the control unit 8. Thereby, it is possible that individual flows of the heat exchanger 2 can be separated completely from the air flow, as needed, especially also in the case of heat exchangers 2 functioning as condensers or gas coolers, with flows selectively impinged on by refrigerant. The impinging of air on heat exchangers upstream and/or downstream of the heat exchanger 2 functioning as a condenser or gas cooler represents an additional criterion. Said heat exchangers in this manner are not completely cut off from the air flow and, instead, are locally flowed through by a partial air flow in order to implement a required cooling capacity in this manner.

The air supply device 7.0 can also be implemented so that the air flaps 7.01 are combined in groups, and each group of such air flaps 7.01 in each case is jointly controlled by the control unit 8 and thus pivoted independently of the other group of air flaps. Each of this group of air flaps generates a partial air flow of the environmental air flow, of which the amount of air is generated independently of the amount of air of the other partial air flow.

An equivalent embodiment of the device 7 implemented as air supply device 7.0 consists in subdividing said device into at least two partial devices 7.1 and 7.2, as represented diagrammatically in FIG. 2. Each of these partial devices 7.1 and 7.2 is designed as air supply device 7.10 and 7.20 with air flaps 7.11 and 7.21. An environmental air flow L impinging on such a device 7 is divided by the two partial devices 7.1 and 7.2 into two partial cooling air flows L11 and L12 which in turn impinge on two disjoint cooling surfaces A1 and A2 of the heat exchanger 2.

In such an air supply device 7 subdivided into two partial devices 7.1 and 7.2, a heat exchanger 2 can be used which is implemented with two flows, a first flow 2.1 and a second flow 2.2. The first flow 2.1 is arranged in the vehicle vertical direction (z direction) below the second flow 2.2 and thus corresponds to the cooling surface A1, while the second flow 2.2 corresponds to the cooling surface A2.

A two-flow flow through the heat exchanger 2 then occurs if the environmental temperature of the vehicle is higher than the temperature limit value or if the pressure difference between the high pressure and the low pressure of the refrigerant circuit 1 is greater than the pressure difference threshold. In this case, the two air supply devices 7.10 and 7.20 are actuated simultaneously by a control unit 8, in that their air flaps 7.11 and 7.21 are pivoted from a predetermined position in the direction of its open position by a predetermined amount, whereby the amount of air of each of the two partial cooling air flows L11 and L12 is increased.

A single-flow flow through the heat exchanger 2, namely through the first flow 2.1, occurs if the environmental temperature of the vehicle is equal to or less than the temperature limit value or if the pressure difference between the high pressure and the low pressure of the refrigerant circuit 1 is equal to or less than the pressure difference threshold value. In this heat exchanger 2 of which a partial surface is impinged on by refrigerant, the lower air supply device 7.20 is closed, that is to say its air flaps 7.21 are closed, or the amount of air of the partial cooling air flow generated by this air supply device 7.20 is controlled by the control unit 8 to a predetermined value in the direction of its closed position. In this case, the partial cooling air flow L11 of the upper air flow device 7.10 impinges on the cooling surface A1 of the second flow 2.2 of the heat exchanger 2, through which no refrigerant flows. If the heat exchanger 2 is arranged in a cooler pack with at least one cooler or a water cooling circuit for cooling a combustion engine, this cooler can be impinged on by the partial cooling air flow L11 or the amount of air thereof can be controlled.

However, for aerodynamic reasons it is reasonable to move the device 7 as close as possible in the direction of the cooling air inlet of the vehicle, i.e., to the area of the vehicle outer shell of the vehicle, which however has the consequence that, with the movement of the air flap 7.01, the entire cooler pack is affected in the same manner by a reduction of the total air flow L1 and not only individual sectors of the cooler pack, as allowed by the implementation according to FIG. 2.

The method carried out by such a refrigeration system according to FIGS. 1 and 2 for conditioning the supply flow into the vehicle interior, in particular for cooling and/or dehumidifying this supply flow at an environmental temperature around the freezing point or slightly higher, ensures a stable refrigeration system operation.

The invention claimed is:

1. A method for operating a refrigeration system for a vehicle with a refrigerant circuit comprising:
   flowing a controllable environmental air flow (L) through a heat exchanger, wherein the heat exchanger can be operated as a refrigerant condenser or a gas cooler for a refrigeration system operation, for setting a predetermined pressure ratio between the high pressure and the low pressure of the refrigerant circuit, wherein the amount of air of the environmental air flow (L) flowing through the heat exchanger is controlled by a device as a function of a temperature limit value of the environmental temperature of the vehicle, wherein above the temperature limit value, the amount of air flowing through the heat exchanger is increased by the device, and
   at an environmental temperature corresponding at most to the temperature limit value, decreasing the amount of air flowing through the heat exchanger by controlling the device.

2. The method according to claim 1, wherein the device is designed as a controllable air supply device.

3. The method according to claim 2, wherein the air supply device is formed with a plurality of pivotable air flaps which can be pivoted individually, jointly or in groups between an open position and a closed position.

4. The method according to claim 3, wherein a cooling air flow (L1) from the environmental air flow (L) is set by means of the device with a cross section which corresponds to the maximum cooling surface of the heat exchanger.

5. The method according to claim 3, wherein the device is formed with at least two partial devices, wherein the partial devices correspond to disjoint cooling surfaces of the heat exchanger, in such a manner that the partial cooling air flow generated by a partial device from the environmental air flow (L) impinges on the cooling surface of the heat exchanger.

6. The method according to claim 2, wherein a cooling air flow (L1) from the environmental air flow (L) is set by means of the device with a cross section which corresponds to the maximum cooling surface of the heat exchanger.

7. The method according to claim 2, wherein the device is formed with at least two partial devices, wherein the partial devices correspond to disjoint cooling surfaces of the heat exchanger, in such a manner that the partial cooling air flow generated by a partial device from the environmental air flow (L) impinges on the cooling surface of the heat exchanger.

8. The method according to claim 1, wherein a cooling air flow (L1) from the environmental air flow (L) is set by means of the device with a cross section which corresponds to the maximum cooling surface of the heat exchanger.

9. The method according to claim 8, wherein the device is formed with at least two partial devices, wherein the partial devices correspond to disjoint cooling surfaces of the heat exchanger, in such a manner that the partial cooling air flow generated by a partial device from the environmental air flow (L) impinges on the cooling surface of the heat exchanger.

10. The method according to claim 1, wherein the device is formed with at least two partial devices, wherein the partial devices correspond to disjoint cooling surfaces of the heat exchanger, in such a manner that the partial cooling air flow generated by a partial device from the environmental air flow (L) impinges on the cooling surface of the heat exchanger.

* * * * *